United States Patent
Alsup et al.

(10) Patent No.: US 10,968,043 B1
(45) Date of Patent: Apr. 6, 2021

(54) ANTI-SURGE DOG LINK FOR A SHARP CHAIN CONVEYOR

(71) Applicants: Raymond Lee Alsup, Malvern, AR (US); Steven Dwayne Bewley, Russellville, AR (US); Gerald Alan Burgener, Hot Springs, AR (US); Michael Lynn Creekmore, Dardanelle, AR (US); David A. Finn, Hot Springs, AR (US); Robert W. Hiett, Dardanelle, AR (US); Sabrina Lynn Kendrick, Russellville, AR (US); Raymond D. Lilley, Dardanelle, AR (US); Kelly April Chambers, Dardanelle, AR (US); Russell Kyle Roberson, Russellville, AR (US); Matthew S. Rogers, Hahira, GA (US); Tim Major Stark, Atkins, AR (US); Tommy Ronald Teague, Pottsville, AR (US)

(72) Inventors: Raymond Lee Alsup, Malvern, AR (US); Steven Dwayne Bewley, Russellville, AR (US); Gerald Alan Burgener, Hot Springs, AR (US); Michael Lynn Creekmore, Dardanelle, AR (US); David A. Finn, Hot Springs, AR (US); Robert W. Hiett, Dardanelle, AR (US); Sabrina Lynn Kendrick, Russellville, AR (US); Raymond D. Lilley, Dardanelle, AR (US); Kelly April Chambers, Dardanelle, AR (US); Russell Kyle Roberson, Russellville, AR (US); Matthew S. Rogers, Hahira, GA (US); Tim Major Stark, Atkins, AR (US); Tommy Ronald Teague, Pottsville, AR (US)

(73) Assignee: Omega Solutions, Inc., Russellville, AR (US)

( * ) Notice: Subject to any disclaimer, the term of this patent is extended or adjusted under 35 U.S.C. 154(b) by 0 days.

(21) Appl. No.: 16/720,591

(22) Filed: Dec. 19, 2019

(51) Int. Cl.
*B65G 17/40* (2006.01)
*B65G 17/32* (2006.01)
*B27B 31/00* (2006.01)

(52) U.S. Cl.
CPC ............ *B65G 17/40* (2013.01); *B27B 31/006* (2013.01); *B65G 17/32* (2013.01); *B65G 2201/0282* (2013.01); *B65G 2812/02376* (2013.01)

(58) Field of Classification Search
CPC ...... B65G 17/002; B65G 17/40; B65G 17/42; B65G 17/44; B65G 17/46; B27B 31/006
(Continued)

(56) References Cited

U.S. PATENT DOCUMENTS

| 208,321 | A | * | 9/1878 | Lemieux | ........................ 198/692 |
| 223,904 | A | * | 1/1880 | Gleason | ........................ 198/692 |

(Continued)

FOREIGN PATENT DOCUMENTS

CA      2349805      8/2002

OTHER PUBLICATIONS

L. Lemieux, U.S. Pat. No. 208,321, "Jack-Chain for Saw-Mills," Issued Sep. 24, 1878 (Could not be entered in U.S. Patents section above).

(Continued)

*Primary Examiner* — Joseph A Dillon, Jr.
(74) *Attorney, Agent, or Firm* — Richard Blakely Glasgow

(57) ABSTRACT

A dog link for a sharp chain conveyor with at least one spike to impale into a log, where at least one forwardly and/or
(Continued)

upwardly facing spike on each dog link is combined with at least one rearwardly facing spike and/or barb disposed on a spike to insure that wherever the log is impaled, the dog counteracts any forward surge and more securely impales the log.

22 Claims, 15 Drawing Sheets

(58) Field of Classification Search
USPC .................................................. 198/692, 693
See application file for complete search history.

(56) References Cited

U.S. PATENT DOCUMENTS

| | | | | |
|---|---|---|---|---|
| 356,973 | A * | 2/1887 | Allman | ........................ 198/692 |
| 801,699 | A * | 10/1905 | Wells | ........................... 198/692 |
| 885,959 | A * | 4/1908 | Schilleman | ................... 198/692 |
| 1,712,376 | A * | 5/1929 | Ernest | .................... D21B 1/063 |
| | | | | 198/692 |
| 2,910,170 | A | 10/1959 | Dodson | |
| 3,202,267 | A * | 8/1965 | Watters | ................... B65G 17/10 |
| | | | | 198/692 |
| 3,608,700 | A * | 9/1971 | Nilsson | ................ B65G 17/323 |
| | | | | 198/794 |
| 3,712,456 | A * | 1/1973 | Kincaid | .................. B65G 19/22 |
| | | | | 198/692 |
| 3,858,713 | A | 1/1975 | Allen | |
| 4,508,149 | A * | 4/1985 | Carroll | .................... B27B 31/00 |
| | | | | 144/242.1 |
| 4,538,949 | A * | 9/1985 | Liet | ...................... A01D 87/127 |
| | | | | 198/692 |
| 4,886,156 | A | 12/1989 | Records | |
| 4,997,080 | A * | 3/1991 | Stroud | ................... B27B 25/04 |
| | | | | 144/245.2 |
| 5,372,246 | A * | 12/1994 | van Aalst | ............. B65G 17/063 |
| | | | | 198/692 |
| 6,394,259 | B1 * | 5/2002 | Alhainen | ................ B27B 25/02 |
| | | | | 144/248.6 |
| 6,446,790 | B1 | 9/2002 | Roberson | |
| 6,811,022 | B2 | 11/2004 | Seffens | |
| 7,631,748 | B2 | 12/2009 | Mitchell | |
| 10,016,920 | B2 * | 7/2018 | Keb | ....................... B65G 17/46 |
| 2002/0112941 | A1 | 8/2002 | Roberson | |
| 2007/0205085 | A1 * | 9/2007 | McLaughlin | ........ B65G 19/205 |
| | | | | 198/850 |
| 2009/0250324 | A1 * | 10/2009 | Menke | ................... B65G 17/40 |
| | | | | 198/845 |
| 2010/0200118 | A1 * | 8/2010 | Krauss | ................. B65G 17/065 |
| | | | | 144/357 |
| 2013/0048471 | A1 * | 2/2013 | Capps, Jr. | .............. B65G 15/12 |
| | | | | 198/692 |
| 2013/0298372 | A1 * | 11/2013 | Williams | ............ B29C 66/7392 |
| | | | | 29/426.2 |
| 2019/0276240 | A1 * | 9/2019 | Cornelissen | ........... B65G 17/08 |

OTHER PUBLICATIONS

R.E. Gleason, U.S. Pat. No. 223,904, "Log-Carrying or Bull-Chain," Issued Jan. 27, 1880 (Could not be entered in U.S. Patents section above).

E.H. Allman, U.S. Pat. No. 356,973, "Log Dog," Issued Feb. 1, 1887 (Could not be entered in U.S. Patents section above).

J.F. Wells, U.S. Pat. No. 801,699, "Shoe for Conveyor Chains," Issued Oct. 10, 1905 (Could not be entered in U.S. Patents section above).

J. Schilleman, U.S. Pat. No. 885,959, "Log Conveyor Chain," Issued Apr. 28, 1908 (Could not be entered in U.S. Patents section above).

* cited by examiner

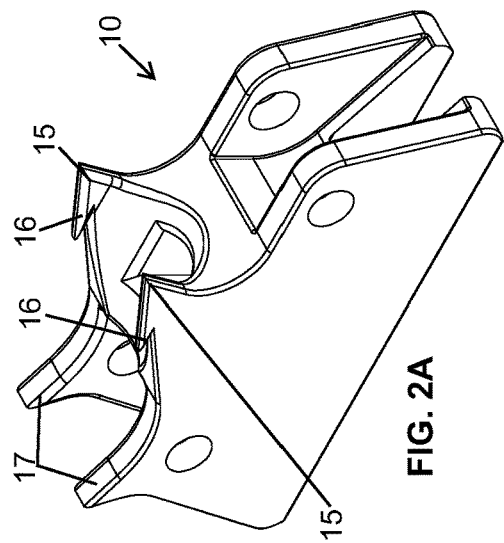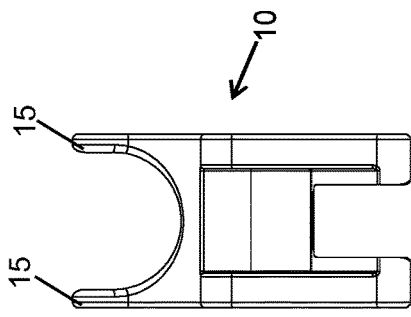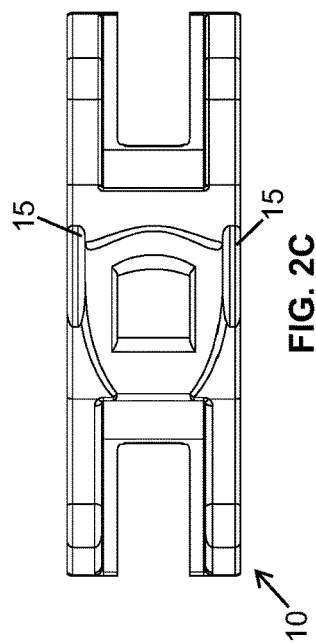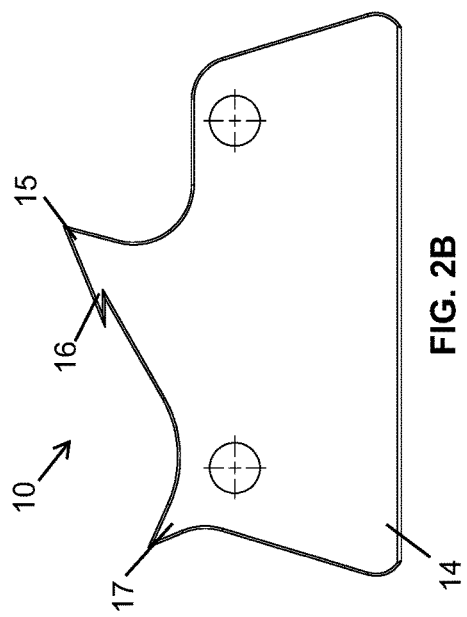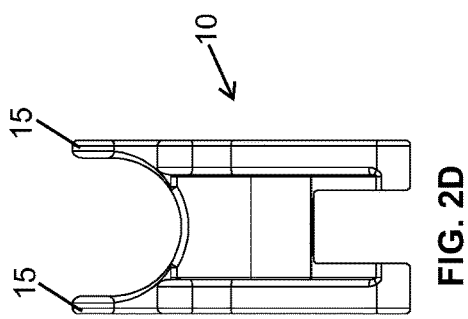

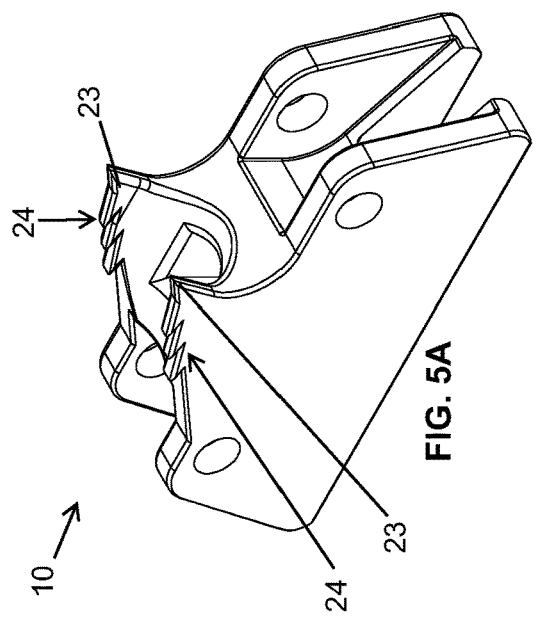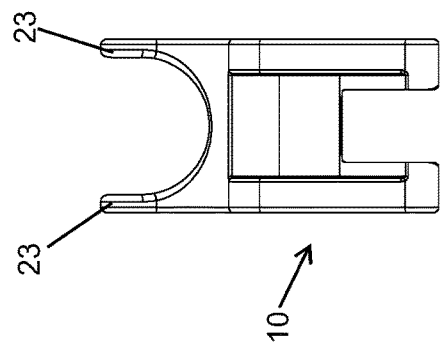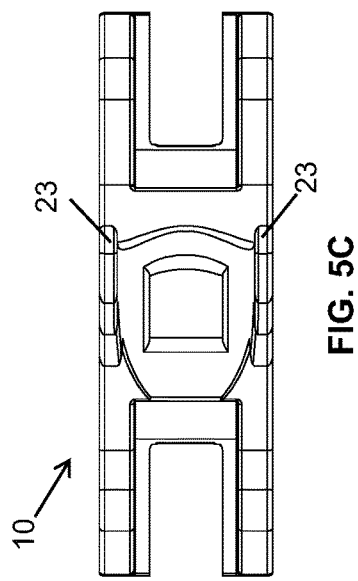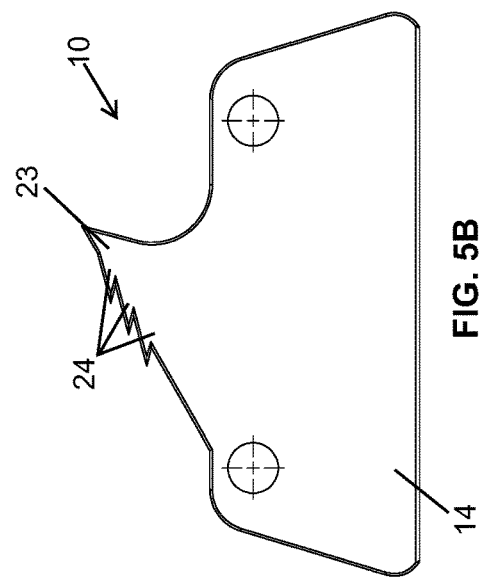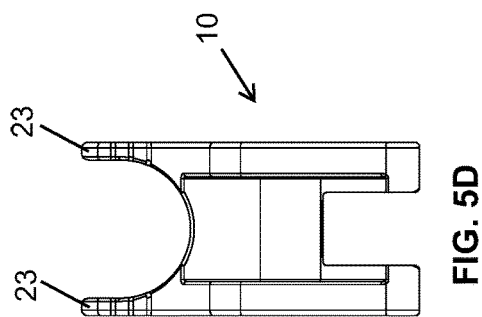

ANTI-SURGE DOG LINK FOR A SHARP CHAIN CONVEYOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to a dog link or spiked link for a sharp chain log conveyor, and in particular, to such a dog link or spiked link having a configuration of spikes and barbs to resist forward surging of a log.

2. Brief Description of the Related Art

A conveyor known as a sharp chain is employed in sawmills to convey and feed logs into a saw. The sharp chain is typically a link-type chain in which alternating links have upstanding spikes for engaging the log and maintaining it in a fixed orientation. These links, referred to as spiked links or dog links, are connected by pins to connecting links. The whole forms an endless chain which is sprocket-driven. The endless chain passes around at least one infeed sprocket gear and at least one outfeed sprocket gear. An example of a sharp chain conveyor with a spiked link or dog link is described in U.S. Pat. No. 6,446,790, which is incorporated herein by reference. The terms "spiked link" and "dog link" are used herein interchangeably.

BRIEF SUMMARY OF THE INVENTION

The present invention is directed to a sharp chain dog link with a spike used to impale a log. Presently, all known dog links have a spike that is either vertical or angled in one direction with a sharp apex, either a smooth point or a chiseled edge construction.

Some users alternate these links with the prominent spike direction alternating from forwardly facing on one link to rearwardly facing on an adjacent link in order to minimize forward surging of the log. When dog links have alternately forwardly facing and rearwardly facing spikes, forward surge of the log is counteracted only if the log is impaled in one of the rearwardly facing links. Due to the curved and swept shapes of logs and depending on the possible swell on the butt ends of logs, it is important to have anti-surge capability on every dog link because there may only be two spikes impaled in these type of logs. Furthermore, logs are less likely to be impaled and, if impaled, tend to impale less securely on rearwardly facing links.

The present invention incorporates forwardly and/or upwardly facing spikes in combination with rearwardly facing spikes and/or barbs on the spikes on each dog link. By employing such a combination of spikes and/or barbs, the log is more securely impaled. Also, this design reduces or eliminates forward surging of the log during the cutting of the log as it is transported through the cutting mechanisms, i.e. chipper heads and/or saws.

As used herein, the term "spike" is intended to refer to a principal member having a sharp apex on which a log is impaled. The term "barb" is intended to refer to a protrusion having a sharp apex extending from a spike with the apex of the "barb" oriented in a different direction than the direction of the apex of the "spike" such that the "barb" resists or opposes the log pulling off of the "spike" on which it is impaled. The term "barb" is used herein is a sense analogously to a barb on a fishhook in that the fishhook barb resists a fish from pulling off of a fishhook which the fish has taken. The barb thus resists or opposes the forward surge of a log by resisting or opposing the log pulling off of a spike on which it is impaled. A rearwardly facing barb may also function similarly to a rearwardly facing spike in that both are oriented so as to directly resist or oppose any forward surge of the log.

As used herein, the term "forwardly" is not limited to the specific direction of motion of a link along the chain conveyor but is intended to refer to any direction which can be resolved into components including one component in the direction of motion of the chain conveyor. The term "rearwardly" likewise refers to any direction which can be resolved into components including one component opposite to the direction of motion of the chain conveyor. The term "vertically" is intended to refer to a direction orthogonal to a horizontal plane including the raceway of the chain conveyor. For example, a spike with an apex facing 45 degrees upwardly from the horizontal plane and 45 degrees to the left from the direction of motion of the chain conveyor would be considered to be forwardly facing. Likewise, a barb with an apex facing 45 degrees downwardly from the horizontal plane and 45 degrees to the right of the direction of motion of the chain conveyor would be considered to be forwardly facing. "Left" and "right" are determined with respect to the forward direction of the chain conveyor. The direction in which a spike or barb is facing is determined with reference to a line bisecting the tangent lines to the apex of the spike or barb. A spike or a barb may be either straight or curved.

The features, objects and advantages of the present invention will become better understood from a consideration of the following detailed description of the preferred embodiments and appended claims in conjunction with the drawings as described following.

BRIEF DESCRIPTION OF THE SEVERAL VIEWS OF THE DRAWINGS

FIG. 1A is a perspective view. FIG. 1B is a right side view. FIG. 1C is a top view. FIG. 1D is a back view. FIG. 1E is a front view.

FIGS. 2A-2E illustrate an embodiment of an anti-surge dog link according to the present invention including a forwardly facing spike that incorporates a rearwardly facing barb and a rearwardly facing spike. FIG. 2A is a perspective view. FIG. 2B is a right side view. FIG. 2C is a top view. FIG. 2D is a back view. FIG. 2E is a front view.

FIG. 3A is a perspective view. FIG. 3B is a right side view. FIG. 3C is a top view. FIG. 3D is a back view. FIG. 3E is a front view.

FIG. 4A is a perspective view. FIG. 4B is a right side view. FIG. 4C is a top view. FIG. 4D is a back view. FIG. 4E is a front view.

FIGS. 5A-5E illustrate an embodiment of an anti-surge dog link according to the present invention in which a forwardly facing spike incorporates a plurality of barbs on a rear or trailing surface of the spike. FIG. 5A is a perspective view. FIG. 5B is a right side view. FIG. 5C is a top view. FIG. 5D is a back view. FIG. 5E is a front view.

FIG. 6A is a perspective view. FIG. 6B is a right side view. FIG. 6C is a top view. FIG. 6D is a back view. FIG. 6E is a front view.

FIG. 7A is a perspective view. FIG. 7B is a right side view. FIG. 7C is a top view. FIG. 7D is a back view. FIG. 7E is a front view.

FIG. 8A is a perspective view. FIG. 8B is a right side view. FIG. 8C is a top view. FIG. 8D is a back view. FIG. 8E is a front view.

FIG. 9A is a perspective view. FIG. 9B is a right side view.

FIG. 9C is a top view. FIG. 9D is a back view. FIG. 9E is a front view.

FIG. 10A is a perspective view. FIG. 10B is a right side view. FIG. 10C is a top view. FIG. 10D is a back view. FIG. 10E is a front view.

FIG. 11A is a perspective view. FIG. 11B is a right side view. FIG. 11C is a top view. FIG. 11D is a back view. FIG. 11E is a front view.

FIG. 12A is a perspective view. FIG. 12B is a right side view. FIG. 12C is a top view. FIG. 12D is a back view. FIG. 12E is a front view.

FIG. 13A is a perspective view. FIG. 13B is a right side view. FIG. 13C is a top view. FIG. 13D is a back view. FIG. 13E is a front view.

FIG. 14A is a perspective view. FIG. 14B is a right side view. FIG. 14C is a top view. FIG. 14D is a back view. FIG. 14E is a front view.

FIG. 15A is a perspective view. FIG. 15B is a right side view. FIG. 15C is a top view. FIG. 15D is a back view. FIG. 15E is a front view.

DETAILED DESCRIPTION OF THE INVENTION

Although not limited to one type of spiked link or dog link, the present invention is described with respect to a spiked link having a spike to impale a log and in which the spiked links alternate with connecting links connected by connecting pins to together comprise a sharp chain conveyor driven by sprocket gears. The described type of spiked link comprises a pair of legs, which may each have a forwardly or vertically facing spike and a downwardly facing surface to bear against the raceway of the sharp chain conveyor. Two saddles connect the legs. The space between the two saddles defines an opening for receiving a sprocket gear tooth to drive the links and therefore the chain conveyor along the raceway.

The present invention incorporates forwardly and/or upwardly facing spikes on each dog link in combination with rearwardly facing spikes and/or barbs on the spikes to insure that wherever the log is impaled, the dog counteracts any forward surge. By employing such a combination of spikes and/or barbs, the log is more securely impaled and reduces or eliminates forward surging of the log.

Figure 1A:
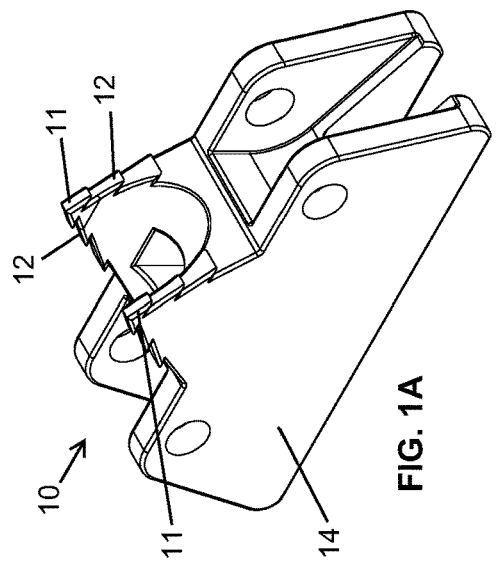
FIGS. 1A-1E illustrate an embodiment of an anti-surge dog link according to the present invention in which a vertically facing spike incorporates a plurality of barbs on both leading and trailing surfaces.
Figure 1E:
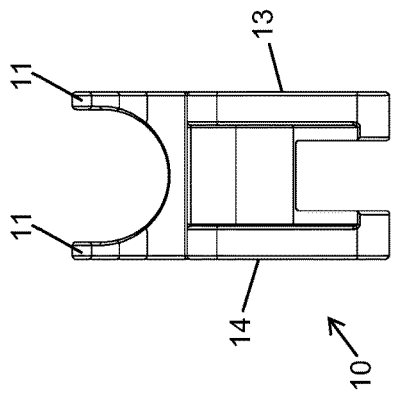
Figure 1C:
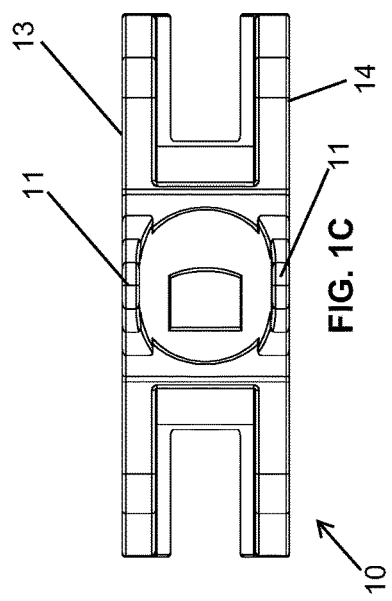
Figure 1B:
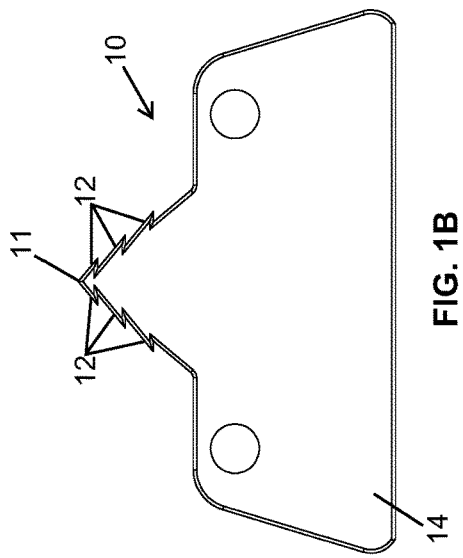
Figure 1D:
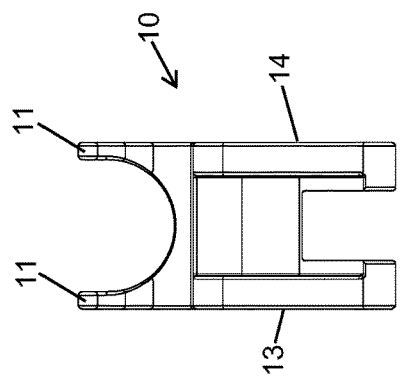

FIGS. 1A-1E illustrate an embodiment of an anti-surge dog link 10 in which a vertically facing spike 11 incorporates a plurality of barbs 12 on both leading and trailing surfaces of the spike 11. In this embodiment, the dog link 10 comprises a left leg 13 and a right leg 14. A spike 11 with leading and trailing barbs 12 is disposed on an upper side of each leg 13, 14 in a symmetrical arrangement.

FIGS. 2A-2E illustrate an embodiment of an anti-surge dog link including a forwardly facing spike 15 disposed on an upper side of the dog link 10. The spike 15 incorporates a rearwardly facing barb 16 on a trailing surface of the spike 15. The dog link 10 also incorporates a rearwardly facing spike 17 disposed toward the rear of the dog link 10.

Figure 3A:
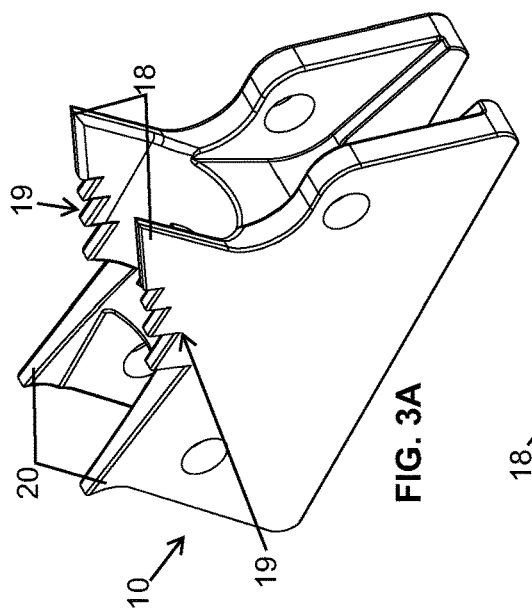
FIGS. 3A-3E illustrate an embodiment of an anti-surge dog link according to the present invention including a forwardly facing spike that incorporates a plurality of rearwardly facing barbs and a rearwardly facing spike.
Figure 3E:
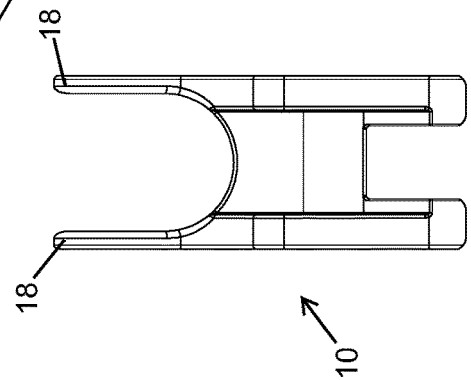
Figure 3C:
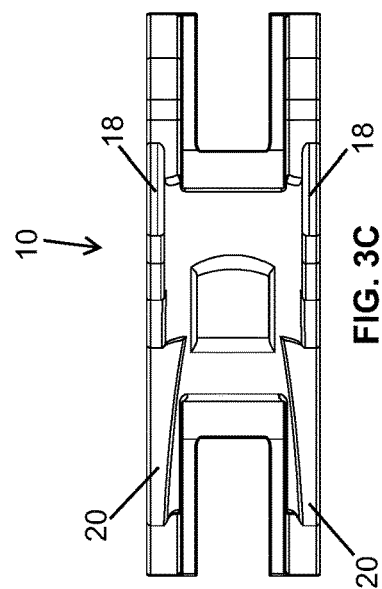
Figure 3B:
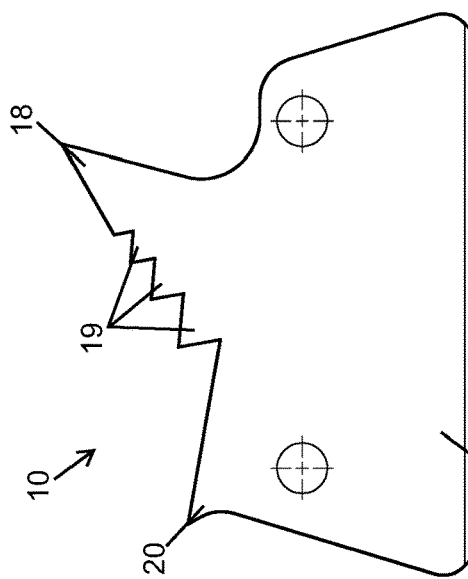
Figure 3D:
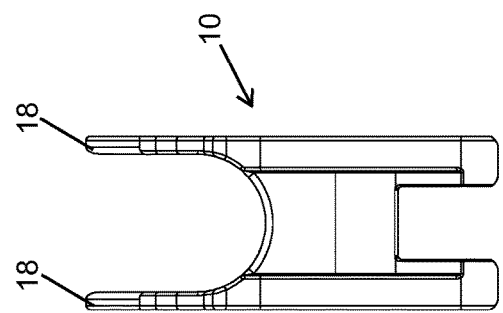

FIGS. 3A-3E illustrate an embodiment of an anti-surge dog link 10 including a forwardly facing spike 18 that incorporates a plurality of rearwardly facing barbs 19 on a trailing surface of the spike 18. The dog link 10 also incorporates a rearwardly facing spike 20 disposed toward the rear of the dog link 10.

Figure 4A:
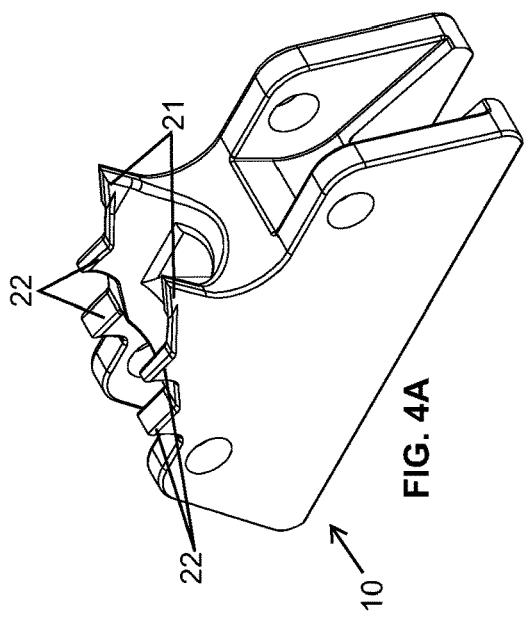
FIGS. 4A-4E illustrate an embodiment of an anti-surge dog link according to the present invention including a forwardly facing spike and a plurality of rearwardly facing spikes.
Figure 4E:
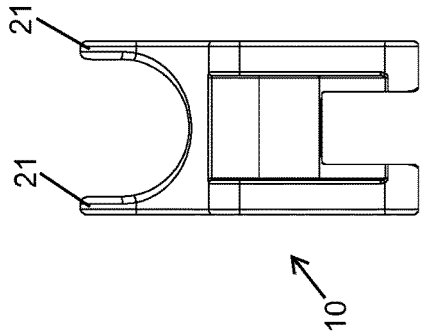
Figure 4C:
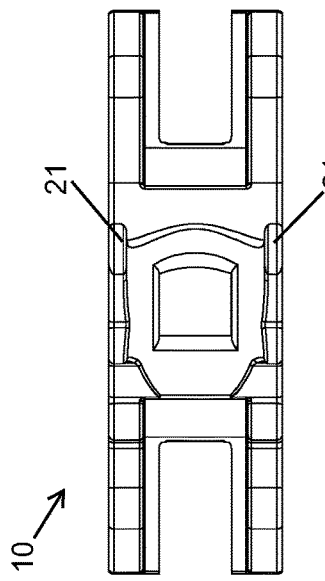
Figure 4B:
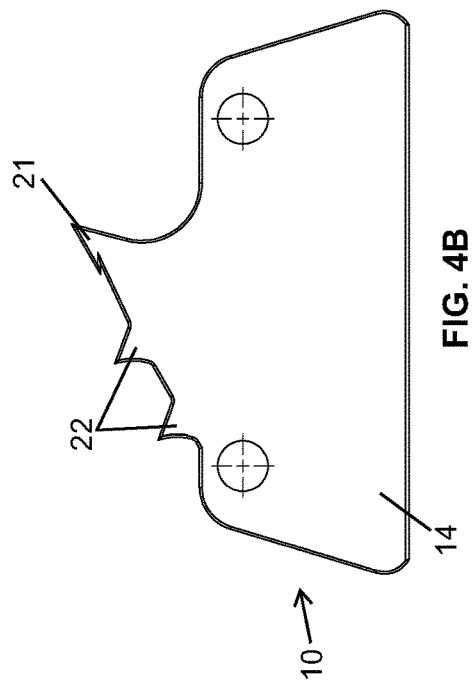
Figure 4D:
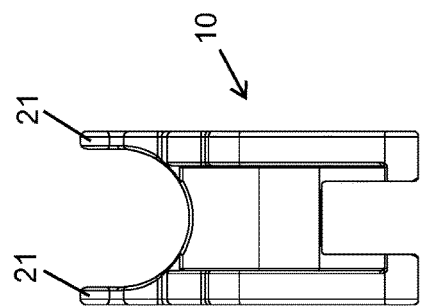

FIGS. 4A-4E illustrate an embodiment of an anti-surge dog link 10 including a forwardly facing spike 21 and a plurality of rearwardly facing spikes 22.

FIGS. 5A-5E illustrate an embodiment of an anti-surge dog link 10 in which a forwardly facing spike 23 incorporates a plurality of barbs 24 on a trailing surface. The spike 23 and trailing barbs 24 are disposed symmetrically on the legs 13, 14 of the dog link 10.

Figure 6A:
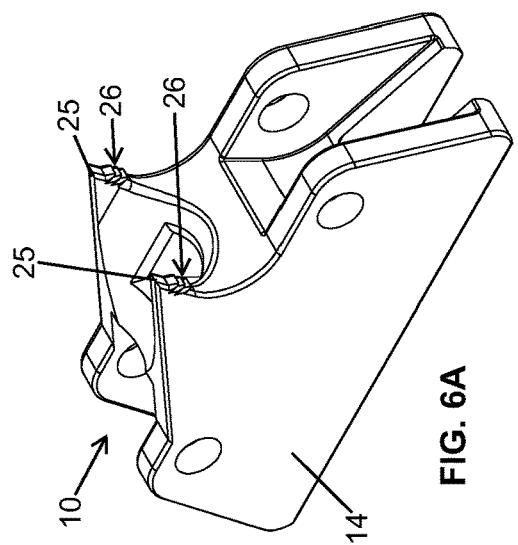
FIGS. 6A-6E illustrate an embodiment of an anti-surge dog link according to the present invention in which a forwardly facing spike incorporates a plurality of barbs on a front or leading surface of the spike.
Figure 6E:
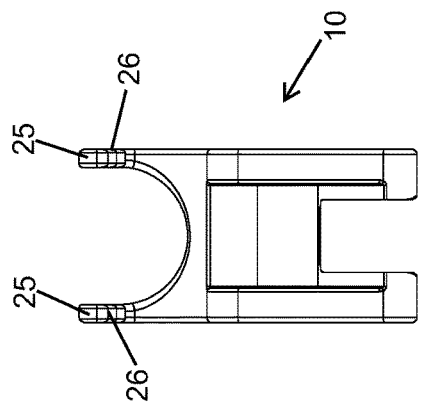
Figure 6C:
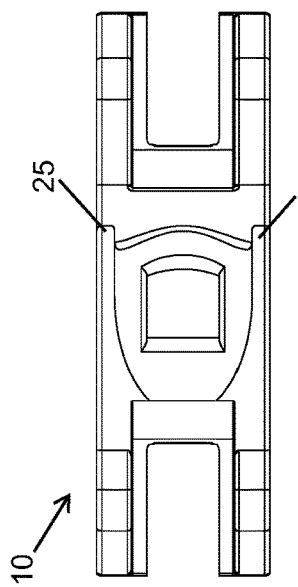
Figure 6B:
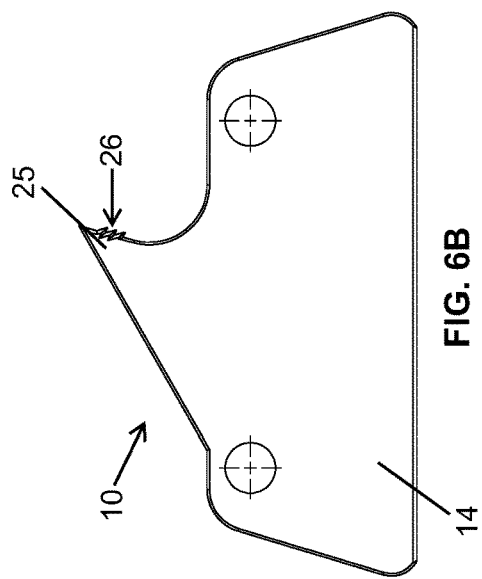
Figure 6D:
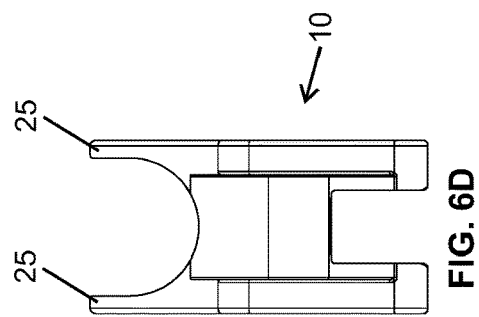

FIGS. 6A-6E illustrate an embodiment of an anti-surge dog link 10 in which a forwardly facing spike 25 incorporates a plurality of barbs 26 on leading surface of the spike 25. The barbs 26 face forwardly and downwardly.

Figure 7A:
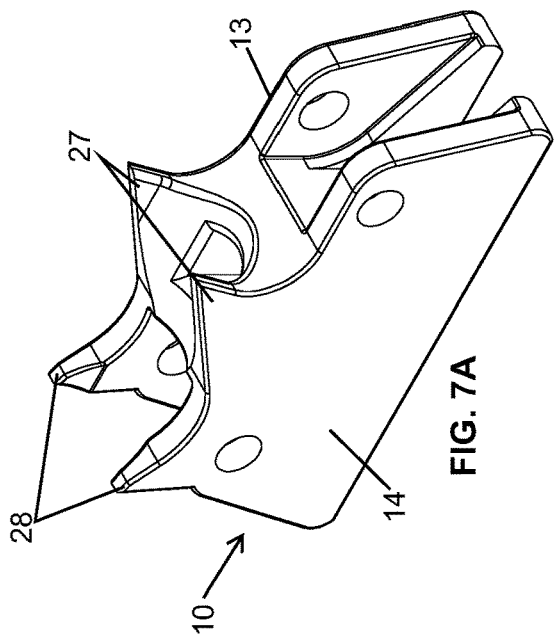
FIGS. 7A-7E illustrate an embodiment of an anti-surge dog link according to the present invention having a forwardly facing spike and a rearwardly facing spike.
Figure 7E:
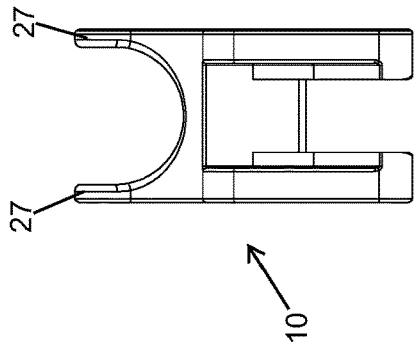
Figure 7C:
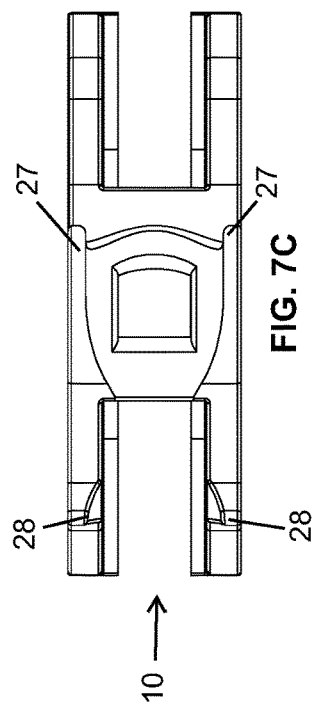
Figure 7B:
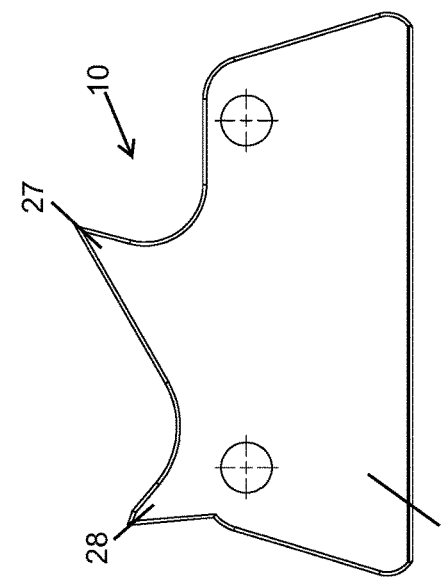
Figure 7D:
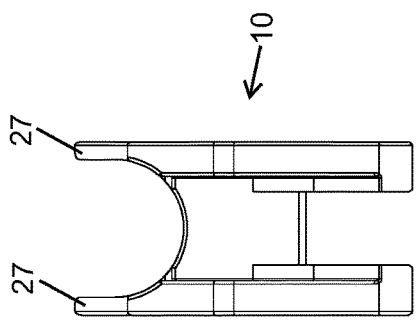

FIGS. 7A-7E illustrate an embodiment of an anti-surge dog link 10 having a forwardly facing spike 27 and a rearwardly facing spike 28. The forwardly facing spike 27 is disposed toward the middle upper portion of the dog link 10, while the rearwardly facing spike 28 is disposed toward the upper rear of the dog link 10.

Figure 8A:
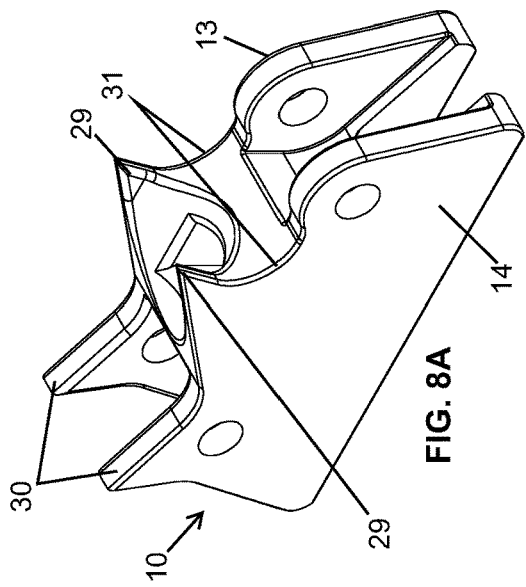
FIGS. 8A-8E illustrate an embodiment of an anti-surge dog link according to the present invention having a forwardly facing spike and a rearwardly facing spike in which a relief in the leg of the spike leads the forwardly facing spike.
Figure 8E:
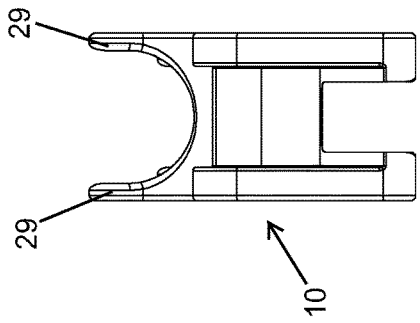
Figure 8C:
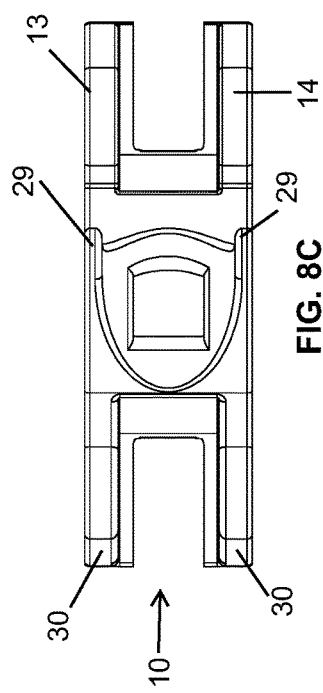
Figure 8B:
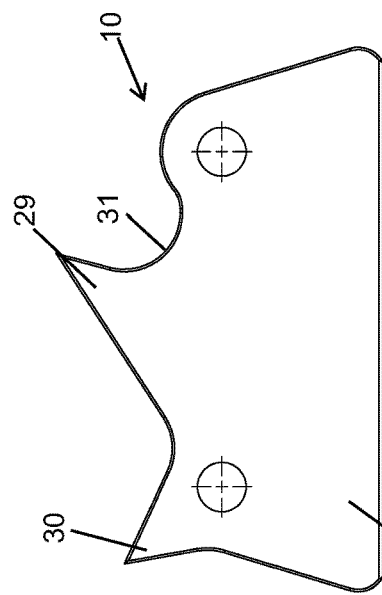
Figure 8D:
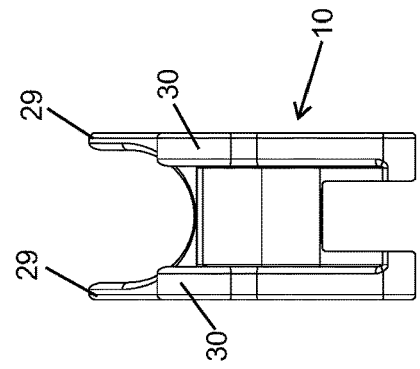

FIGS. 8A-8E illustrates an embodiment of an anti-surge dog link 10 having a forwardly facing spike 29 and a rearwardly facing spike 30. The forwardly facing spike 29 is disposed toward the middle upper portion of the dog link 10, while the rearwardly facing spike 30 is disposed toward the upper rear of the dog link 10. A relief 31 in each of the legs 13, 14 leads the forwardly facing spike 29.

Figure 9A:
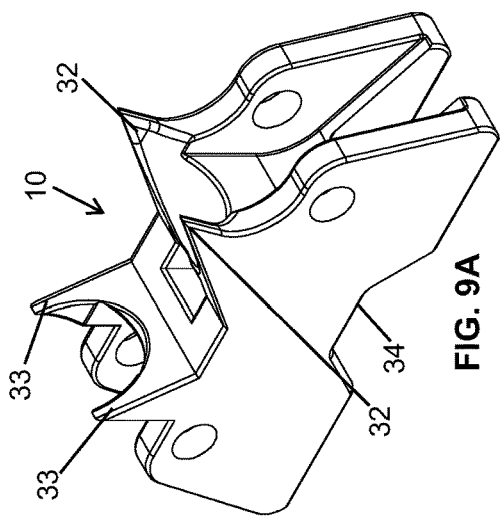
FIGS. 9A-9E illustrates an embodiment of an anti-surge dog link according to the present invention including a forwardly facing spike and a vertically facing spike with the vertically facing spike trailing the forwarding facing spike on the same side of the dog link. The forwardly facing spike is curved while the vertically facing spike is straight.
Figure 9E:
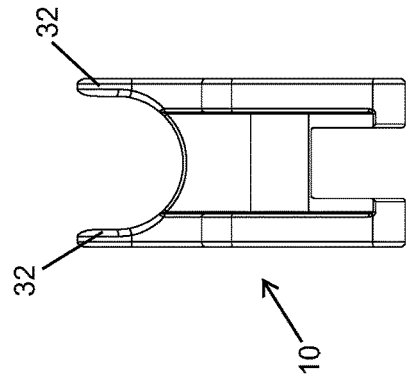
Figure 9C:
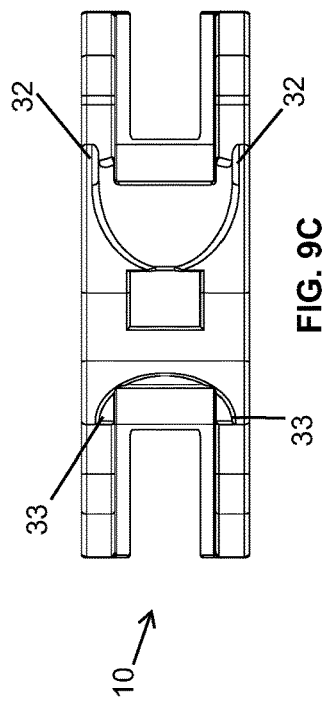
Figure 9B:
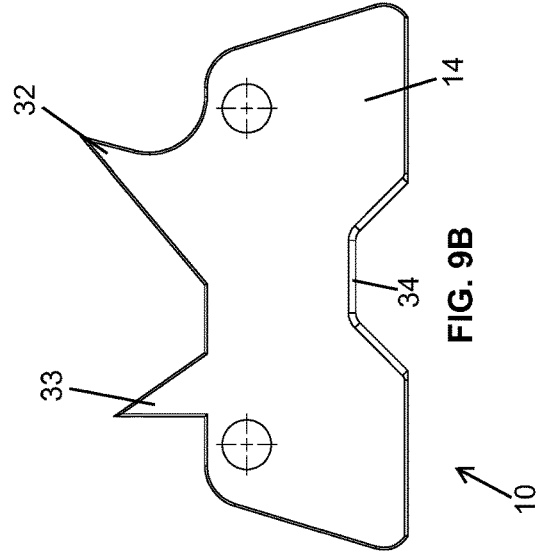
Figure 9D:
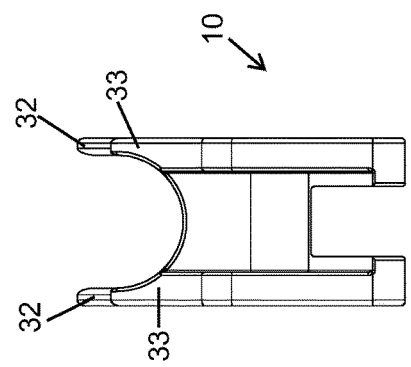

FIGS. 9A-9E illustrates an embodiment of an anti-surge dog link 10 including a forwardly facing spike 32 and a vertically facing spike 33 with the vertically facing spike 33 trailing the forwarding facing spike 32 on the same side of the dog link 10. The forwardly facing spike is 32 curved while the vertically facing spike is straight 31. A relief 34 is disposed on a lower surface of the dog link 10.

Figure 10A:
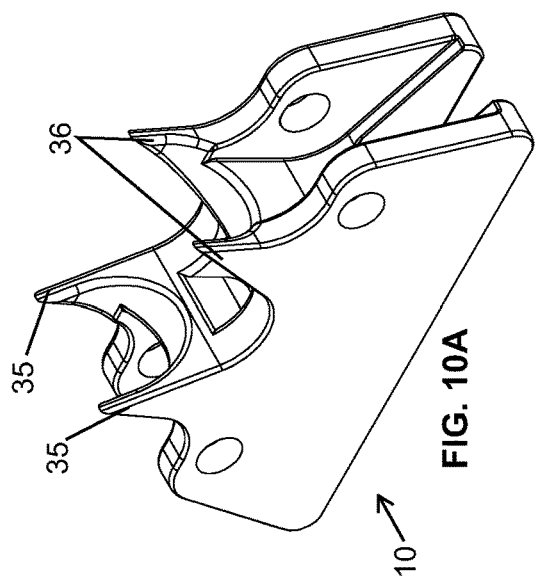
FIGS. 10A-10E illustrates an embodiment of an anti-surge dog link according to the present invention including a pair of spikes with a vertically facing spike trailing a forwardly facing spike on the same side of the dog link. Both spikes are straight.
Figure 10E:
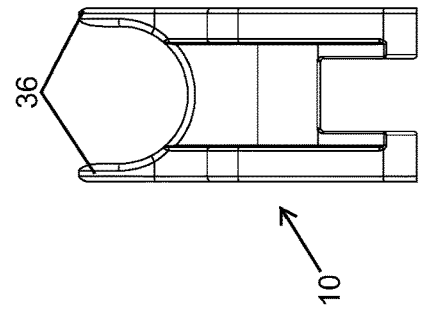
Figure 10C:
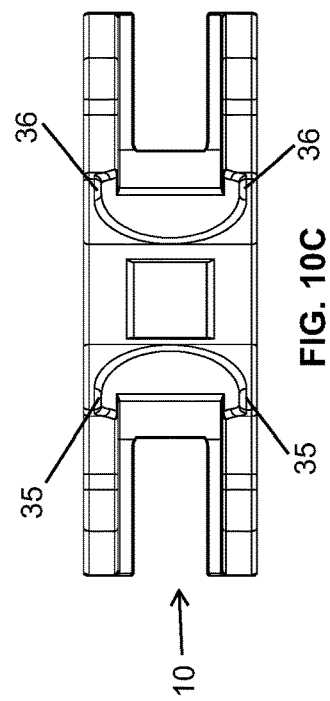
Figure 10B:
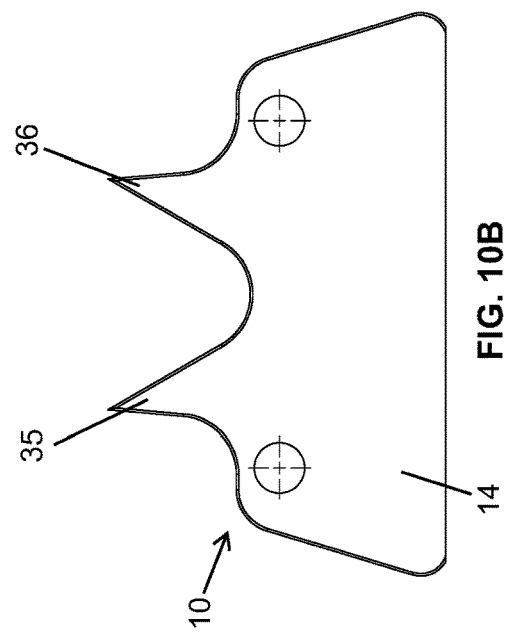
Figure 10D:
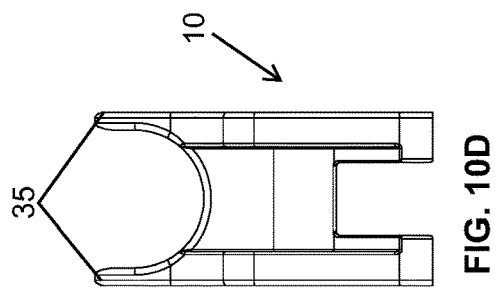

FIGS. 10A-10E illustrates an embodiment of an anti-surge dog link 10 including a pair of spikes with a vertically facing spike 35 trailing a forwardly facing spike 36 on the same side of the dog link 10. Both spikes 35, 36 are straight.

Figure 11A:
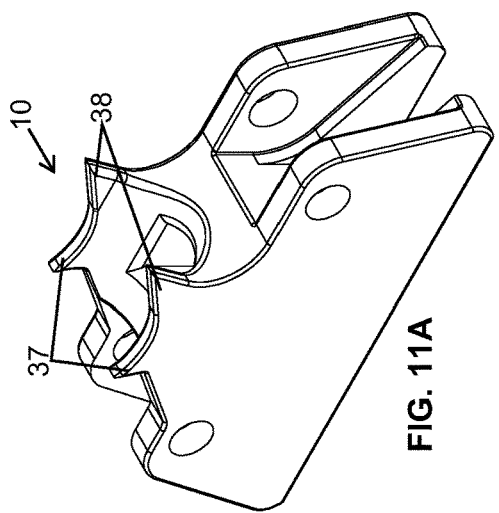
FIGS. 11A-11E illustrate an embodiment of an anti-surge dog link according to the present invention including a pair of spikes with one rearwardly facing spike trailing a forwardly facing spike on the same side of the dog link. The spikes are both curved upwardly and the rearwardly facing spike is lower than the forwardly facing spike. The spikes are mounted close together on the link so as to be disposed on a common foot.
Figure 11E:
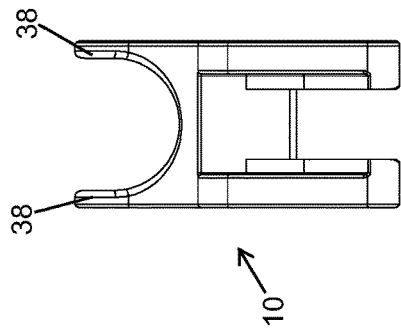
Figure 11C:
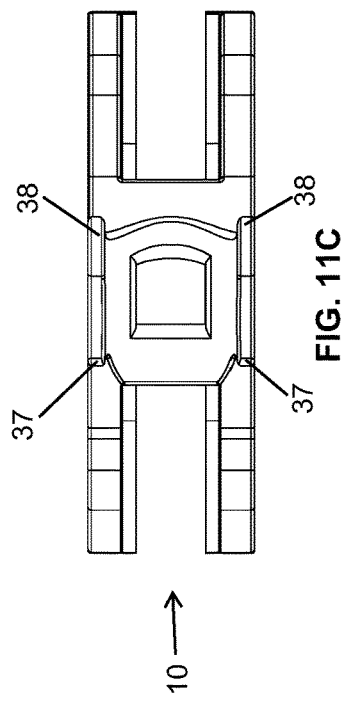
Figure 11B:
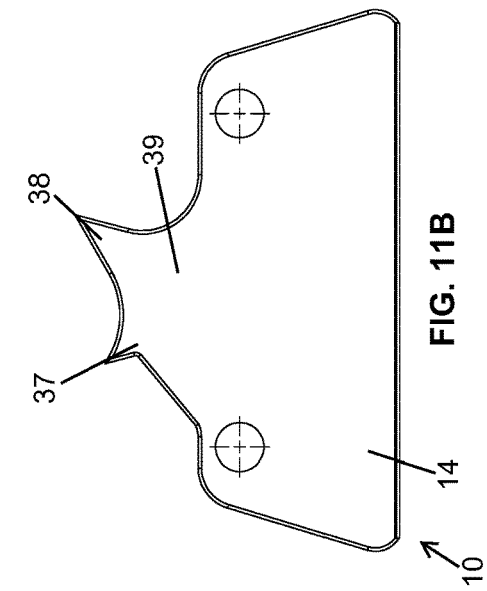
Figure 11D:
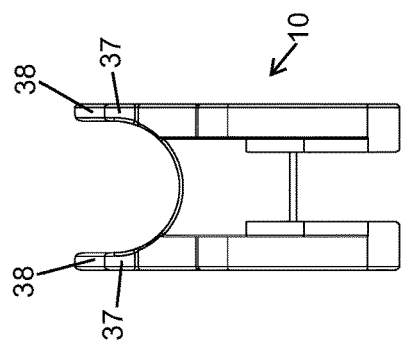

FIGS. 11A-11E illustrates an embodiment of an anti-surge dog link 10 including a pair of spikes with one rearwardly facing spike 37 trailing a forwardly facing spike 38 on the same side of the dog link 10. Both spikes 37, 38 are curved upwardly and the apex of the rearwardly facing spike 37 is lower than the apex of the forwardly facing spike 38. The spikes 37, 38 are mounted closely together on a common pedestal 39 disposed toward the upper middle of the dog link 10.

Figure 12A:
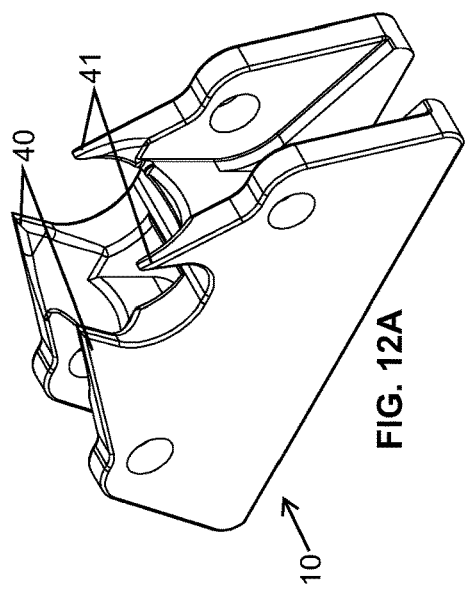
FIGS. 12A-12E illustrate an embodiment of an anti-surge dog link according to the present invention including a pair of spikes with one forwardly facing spike trailing a rearwardly facing spike on the same side of the dog link. The spikes are curved toward each other.
Figure 12E:
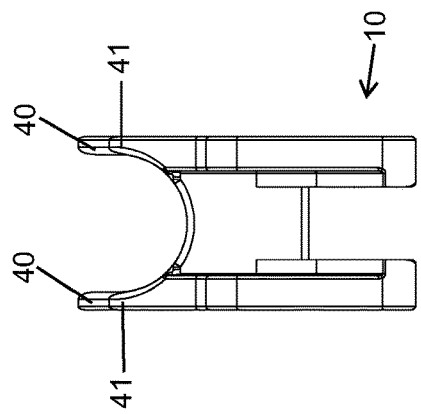
Figure 12C:
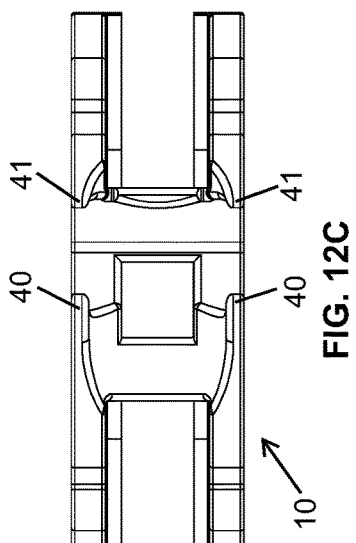
Figure 12B:
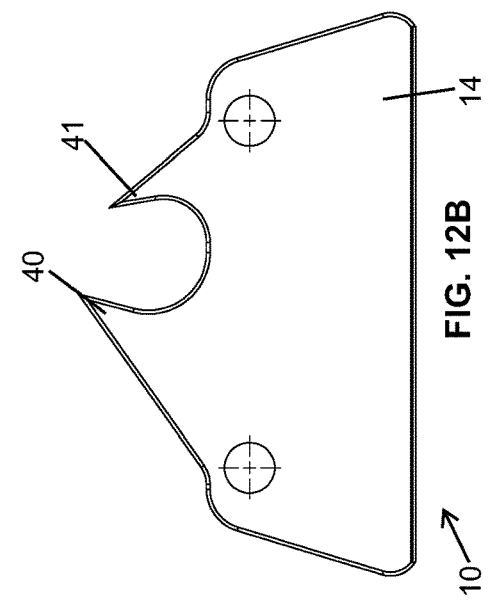
Figure 12D:
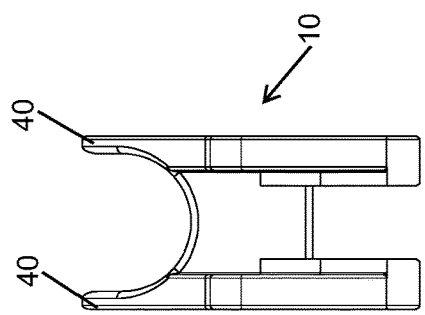

FIGS. 12A-12E illustrates an embodiment of an anti-surge dog link 10 including a pair of spikes with one forwardly facing spike 40 trailing a rearwardly facing spike 41 on the same side of the dog link 10. The spikes 40, 41 are curved toward each other.

Figure 13A:
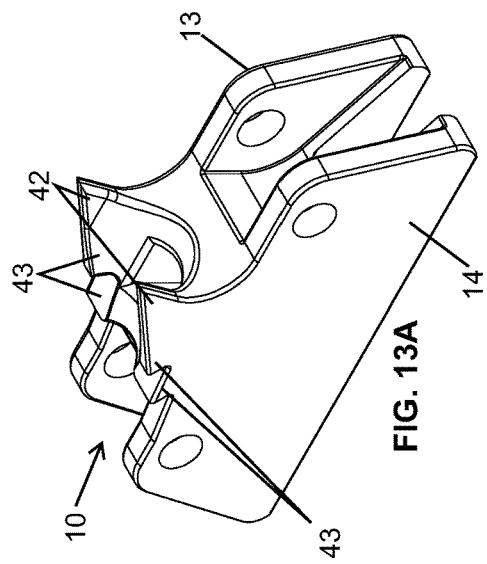
FIGS. 13A-13E illustrate an embodiment of an anti-surge dog link according to the present invention having a forwardly facing spike and a plurality of rearwardly facing barbs mounted closely to the trailing surface of the forwardly facing spike.
Figure 13E:
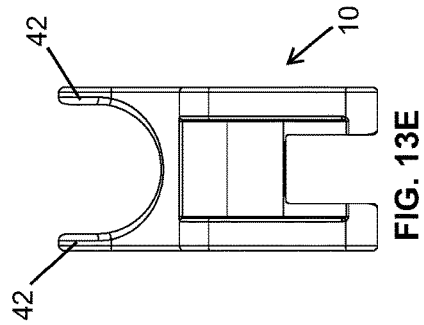
Figure 13C:
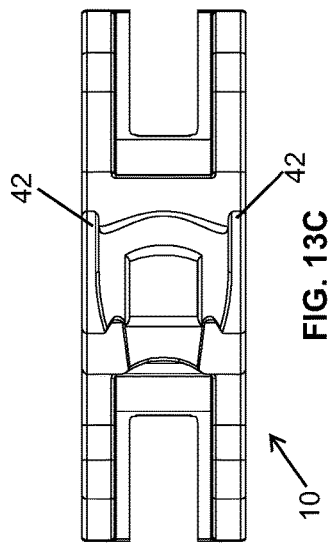
Figure 13B:
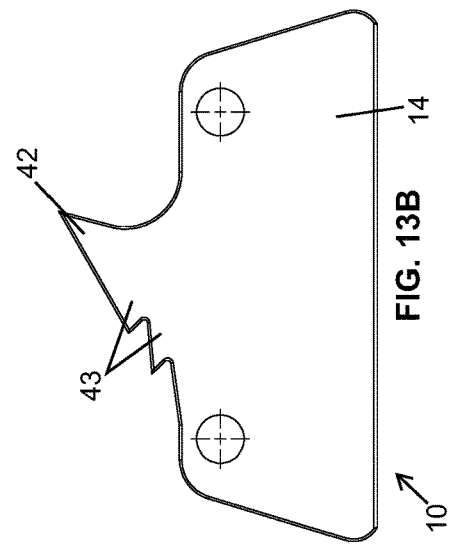
Figure 13D:
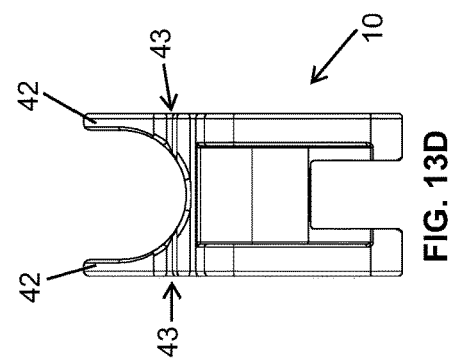

FIGS. 13A-13E illustrates an embodiment of an anti-surge dog link 10 having a forwardly facing spike 42 and a plurality of rearwardly facing barbs 43 mounted closely to the trailing surface of the forwardly facing spike 42.

Figure 14A:
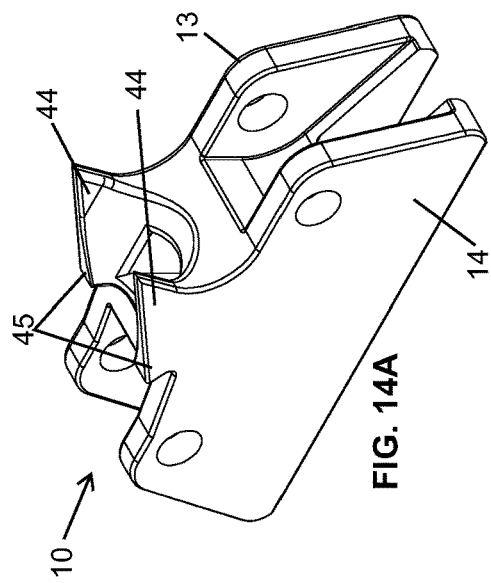
FIGS. 14A-14E illustrate an embodiment of an anti-surge dog link according to the present invention having a forwardly facing spike and a rearwardly facing barb mounted closely to the trailing surface of the forwardly facing spike.
Figure 14E:
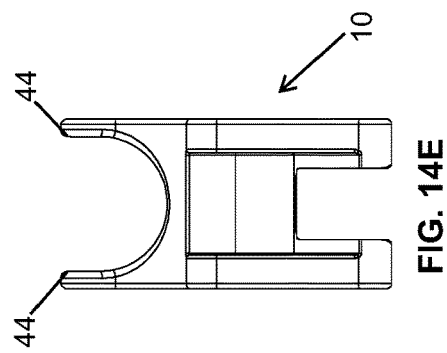
Figure 14C:
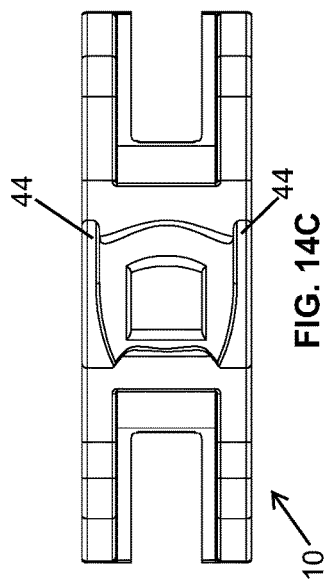
Figure 14B:
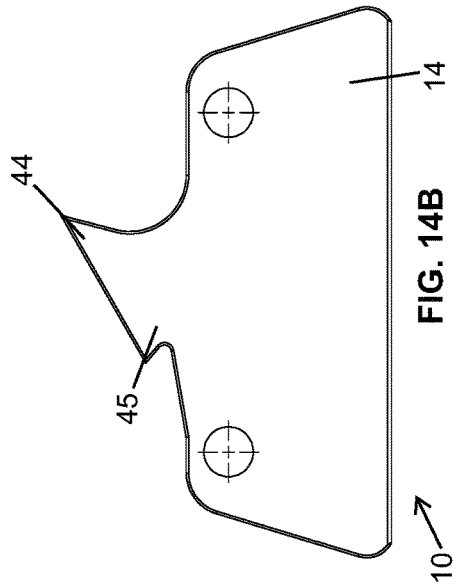
Figure 14D:
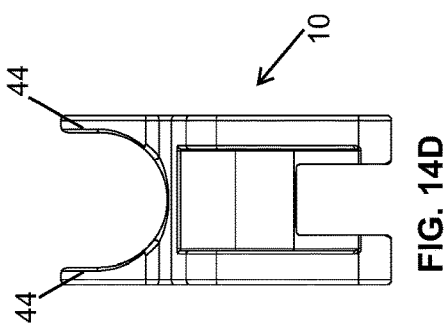

FIGS. 14A-14E illustrates an embodiment of an anti-surge dog link 10 having a forwardly facing spike 44 and a rearwardly facing barb 45 mounted closely to the trailing surface of the forwardly facing spike 44.

Figure 15A:
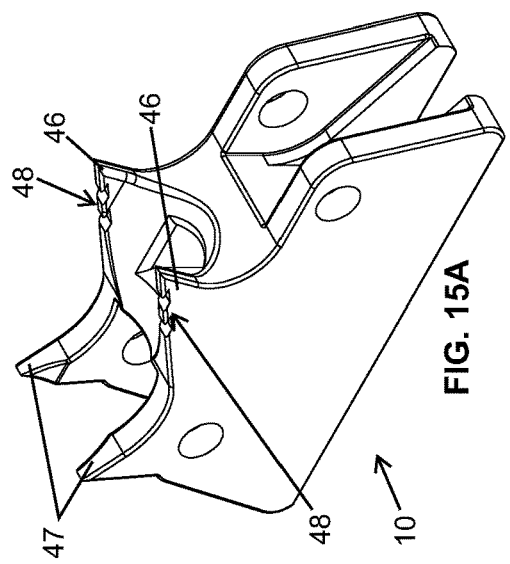
FIGS. 15A-15E illustrate an embodiment of an anti-surge dog link according to the present invention including a rearwardly facing spike and a forwardly facing spike with a plurality of rearwardly facing barbs on a trailing surface of the forwardly facing spike.
Figure 15E:
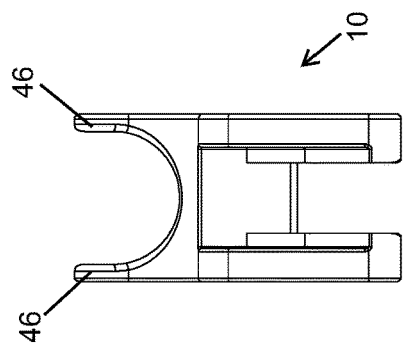
Figure 15C:
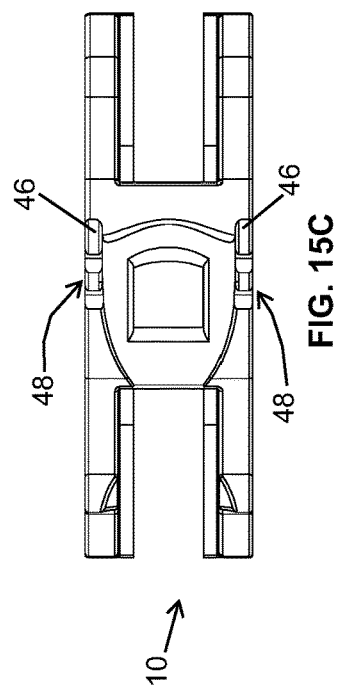
Figure 15B:
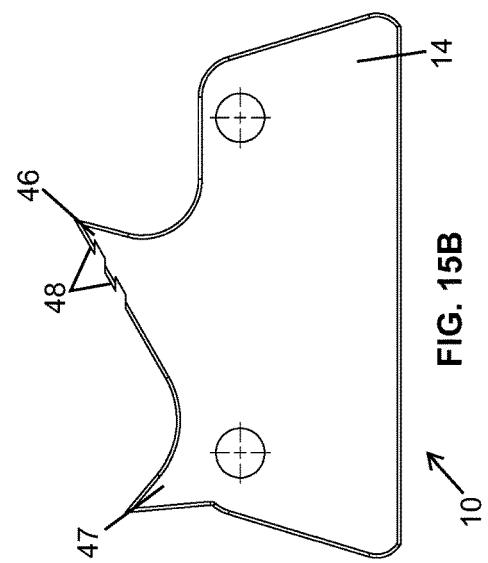
Figure 15D:
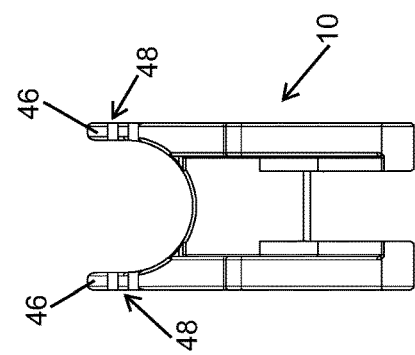

FIGS. 15A-15E illustrates an embodiment of an anti-surge dog link 10 including a rearwardly facing spike 47 and a forwardly facing spike 46 with a plurality of rearwardly facing barbs 48 on a trailing surface of the forwardly facing spike 46.

While the present invention has been described above with respect to embodiments in which the link is symmetrically arranged with an identical array of spikes and barbs on the left side of the link and on the right side of the link, the present invention is not so limited. Also contemplated as being within the scope of the invention are embodiments in which the arrangement of spikes and/or barbs is not symmetrical. As an example, and not by way of limitation, a single link could have a forwardly facing spike on one side of the link and a rearwardly facing link on the other side of the link. Furthermore, the links on a single chain conveyor need not all be identical. In some embodiments, a particular link could have a rearwardly facing spike on one side, while a following link could have a rearwardly facing spike on the other side.

Insofar as the description above and the accompanying drawings disclose any additional subject matter that is not within the scope of the claims presented below, the inventions are not dedicated to the public and the right to add additional claims or to file one or more additional applications to claim such additional inventions is reserved.

The present invention has been described with reference to certain preferred and alternative embodiments that are intended to be exemplary only and not limiting to the full scope of the present invention.

What is claimed is:

1. A dog link for a sharp chain conveyor for conveying a log, comprising:
    a primary member selected from the group consisting of a forwardly facing spike and a vertically facing spike; and
    a secondary member selected from the group consisting of a rearwardly facing spike and a barb disposed on a spike, wherein each of said primary member and said secondary member is operable to impale said log.

2. The dog link of claim 1, wherein said primary member comprises a vertically facing spike.

3. The dog link of claim 1, wherein said primary member comprises a forwardly facing spike.

4. The dog link of claim 2, wherein said secondary member comprises a rearwardly facing spike.

5. The dog link of claim 2, wherein said secondary member comprises a barb disposed on said vertically facing spike.

6. The dog link of claim 4 further comprising a barb disposed on said rearwardly facing spike.

7. The dog link of claim 3 wherein said secondary member comprises a rearwardly facing spike.

8. The dog link of claim 3 wherein said secondary member comprises a barb disposed on said forwardly facing spike.

9. The dog link of claim 7 further comprising a barb disposed on said rearwardly facing spike.

10. The dog link of claim 5, further comprising at least one forwardly facing barb and at least one rearwardly facing barb disposed on said vertically facing spike.

11. The dog link of claim 8, further comprising at least one rearwardly facing barb disposed on said forwardly facing spike.

12. The dog link of claim 11, further comprising a plurality of rearwardly facing barbs disposed on said forwardly facing spike.

13. The dog link of claim 7, further comprising a plurality of rearwardly facing spikes.

14. The dog link of claim 11, further comprising at least one forwardly facing barb disposed on said forwardly facing spike.

15. The dog link of claim 7, further comprising a relief leading said forwardly facing spike.

16. The dog link of claim 2, further comprising a forwardly facing spike.

17. The dog link of claim 16, wherein said forwardly facing spike is curved.

18. The dog link of claim 17, further comprising a lower surface and a relief disposed on said lower surface.

19. The dog link of claim 7, wherein said forwardly facing spike and said rearwardly facing spike are mounted on a common pedestal.

20. The dog link of claim 7, wherein said forwardly facing spike is disposed to trail said rearwardly facing spike.

21. The dog link of claim 7, further comprising a plurality of rearwardly facing spikes.

22. The dog link of claim 7, wherein said rearwardly facing spike is disposed adjacent to a trailing surface of said forwardly facing spike.

\* \* \* \* \*